(12) United States Patent
Kwack et al.

(10) Patent No.: US 9,134,554 B2
(45) Date of Patent: Sep. 15, 2015

(54) DISPLAY DEVICE

(71) Applicants: Jun-Ho Kwack, Yongin (KR);
Young-Sik Kim, Yongin (KR)

(72) Inventors: Jun-Ho Kwack, Yongin (KR);
Young-Sik Kim, Yongin (KR)

(73) Assignee: SAMSUNG DISPLAY CO., LTD.,
Yongin, Gyeonggi-Do (KR)

( * ) Notice: Subject to any disclaimer, the term of this patent is extended or adjusted under 35 U.S.C. 154(b) by 254 days.

(21) Appl. No.: 13/826,325

(22) Filed: Mar. 14, 2013

(65) Prior Publication Data

US 2013/0314762 A1    Nov. 28, 2013

(30) Foreign Application Priority Data

May 22, 2012   (KR) ................. 10-2012-0054358

(51) Int. Cl.
*G06F 1/16*       (2006.01)
*H04M 1/02*       (2006.01)
*G02F 1/09*       (2006.01)
*G09F 9/30*       (2006.01)

(52) U.S. Cl.
CPC ............... *G02F 1/09* (2013.01); *G06F 1/1652* (2013.01); *G09F 9/30* (2013.01); *H04M 1/0268* (2013.01)

(58) Field of Classification Search
CPC ............. G09G 2380/02; G06F 1/1652; G06F 2203/04102
See application file for complete search history.

(56) References Cited

U.S. PATENT DOCUMENTS

| | | | |
|---|---|---|---|
| 2008/0150885 A1* | 6/2008 | Overwijk et al. | 345/107 |
| 2011/0227855 A1* | 9/2011 | Kim et al. | 345/173 |
| 2013/0285922 A1* | 10/2013 | Alberth et al. | 345/173 |

FOREIGN PATENT DOCUMENTS

| | | |
|---|---|---|
| JP | 2010-091990 A | 4/2010 |
| KR | 10-2006-0070535 A | 6/2006 |

* cited by examiner

*Primary Examiner* — Ilana Spar
(74) *Attorney, Agent, or Firm* — Lee & Morse, P.C.

(57) ABSTRACT

A display device includes a flexible display panel with a magnetic pattern, the magnetic pattern including a magnetic substance, a magnetic sensor configured to recognize magnetism of the magnetic pattern and to sense a display area of the flexible display panel in accordance with the magnetic pattern, the display area being variable in a first direction, and a controller connected to the magnetic sensor and to the flexible display panel, the controller being configured to display on the flexible display panel an image corresponding to the display area of the flexible display panel sensed by the magnetic sensor.

15 Claims, 7 Drawing Sheets

DISPLAY DEVICE

CROSS-REFERENCE TO RELATED APPLICATIONS

This application claims priority under 35 USC §119 to and the benefit of Korean Patent Application No. 10-2012-0054358 filed in the Korean Intellectual Property Office on May 22, 2012, the entire contents of which are incorporated herein by reference.

BACKGROUND

1. Field

The described technology relates generally to a display device. More particularly, the described technology relates generally to a display device including a flexible display panel.

2. Description of the Related Art

A display device displays images, and a flexible display device has recently received much attention. The conventional flexible display device represents a device including a flexible display panel for displaying images, and the flexible display panel can be folded or rolled to reduce its size and allow portability.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a display device for displaying an image that is optimized for a flexible characteristic of a flexible display panel.

An exemplary embodiment provides a display device, including a flexible display panel with a magnetic pattern, the magnetic pattern including a magnetic substance, a magnetic sensor configured to recognize magnetism of the magnetic pattern and to sense a display area of the flexible display panel in accordance with the magnetic pattern, the display area being variable in a first direction, and a controller connected to the magnetic sensor and to the flexible display panel, the controller being configured to display on the flexible display panel an image corresponding to the display area of the flexible display panel sensed by the magnetic sensor.

The display device may further include a housing for receiving the flexible display panel in the first direction so that the display area of the flexible display panel may be variably exposed in the first direction.

The housing may include a rolled unit provided in the housing and on which the flexible display panel is wound.

The magnetic sensor may be provided in the housing corresponding to the magnetic pattern.

A first end of the flexible display panel may contact a plate surface of the flexible display panel provided in the first direction when a first area of the flexible display panel is bent so that the display area of the flexible display panel may be variably exposed in the first direction.

The magnetic sensor may be provided at the first end of the flexible display panel.

The magnetic pattern may be formed on the flexible display panel in the first direction.

The magnetic pattern may include a plurality of sub-patterns that are separately disposed from each other in the first direction.

The sub-patterns may be gradually lengthened in a second direction crossing the first direction along the first direction.

The magnetic sensor may have a length corresponding to a sub-pattern that is the longest in the second direction from among the sub-patterns.

The sub-patterns may be separately disposed from each other in the second direction crossing the first direction.

The magnetic sensor may include a plurality of sub-sensors that are disposed to neighbor each other in the second direction, and the sub-sensors correspond to the sub-patterns in the first direction.

DETAILED DESCRIPTION

Example embodiments will be described more fully hereinafter with reference to the accompanying drawings. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the drawings, the thickness of layers, films, panels, regions, etc., may be exaggerated for clarity. It will be understood that when an element is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, throughout the specification, "on" implies being positioned above or below a target element and does not imply being necessarily positioned on the top on the basis of a gravity direction.

A display device according to a first exemplary embodiment will now be described with reference to FIG. 1 through FIG. 4.

Figure 1:
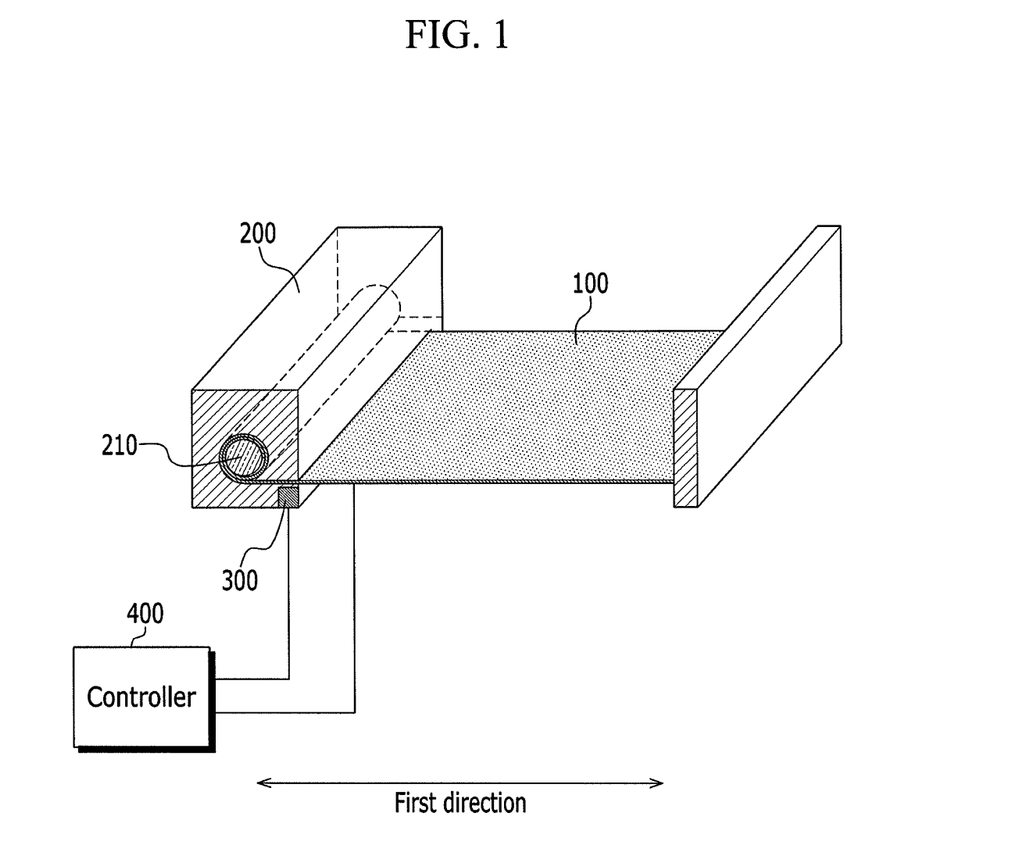
FIG. 1 shows a display device according to a first exemplary embodiment.

FIG. 1 shows a display device according to a first exemplary embodiment. As shown in FIG. 1, the display device includes a flexible display panel 100, a housing 200, a magnetic sensor 300, and a controller 400.

The flexible display panel 100 displays an image processed by the display device. For example, when the display device is a mobile terminal, e.g., a cellular phone, the flexible display panel 100 may display an image related to the mobile terminal, e.g., a user interface (UI) or a graphical user interface (GUI) related to a call. The flexible display panel 100 may include a flexible substrate or film with liquid crystal or an organic light emitting diode. The flexible display panel 100 may be formed to be transparent or light-transmissive so that the outside may be viewed through the flexible display panel 100. A touch sensor having a form of a touch film, a touch sheet, or a touch pad, and sensing a touch operation, is provided on a front surface of the flexible display panel 100. The flexible display panel 100 is connected to the controller 400, and displays an image according to a signal transmitted by the controller 400. The flexible display panel 100 has a flexible characteristic, and it is provided into the housing 200. The flexible display panel 100 is provided in the housing 200 in a first direction, and in this case, the display area of the flexible display panel 100 for displaying the image is variably exposed to the outside in the first direction.

Figure 2:
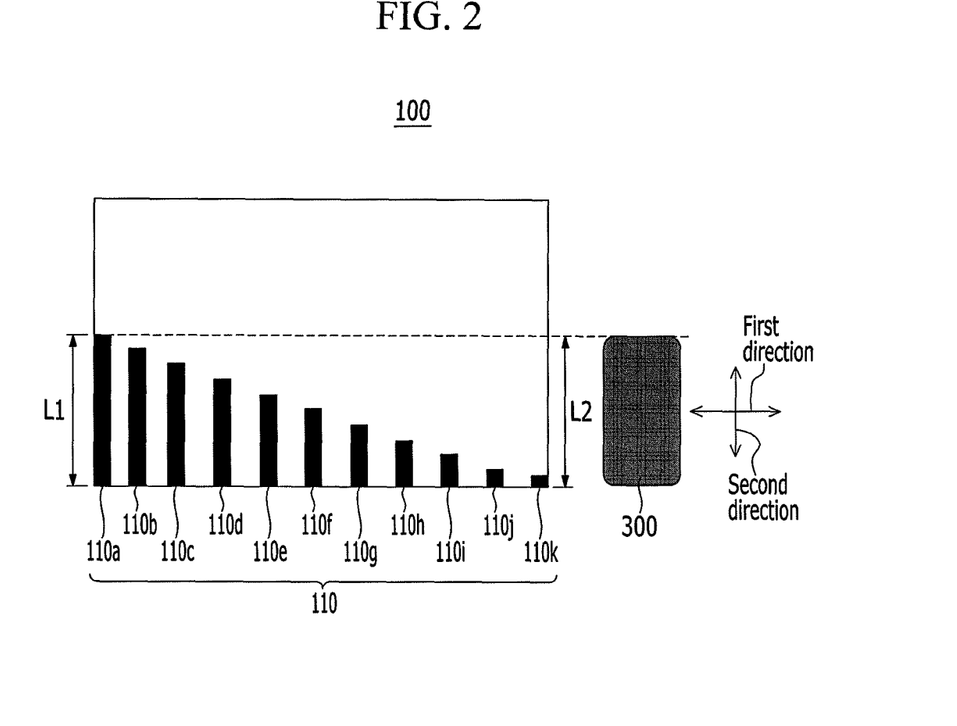
FIG. 2 shows a flexible display panel of a display device according to a first exemplary embodiment.

FIG. 2 shows the flexible display panel 100 according to the first exemplary embodiment. For better understanding and ease of description, FIG. 2 simultaneously shows a rear surface of the flexible display panel 100 and the magnetic sensor 300.

As shown in FIG. 2, the flexible display panel 100 includes a magnetic pattern 110 provided in an area of a rear surface for displaying an image or not displaying it. It is noted, however, that while the magnetic pattern 110 is provided in an area on the rear surface of the flexible display panel 100 in FIG. 2, embodiments are not limited thereto, e.g., a magnetic pattern of a display device may be provided in an area on a front surface of the flexible display panel 100.

In detail, the magnetic pattern 110 may be provided on the front surface of the flexible display panel 100, the rear surface thereof, or between substrates of the flexible display panel. The magnetic pattern 110 may be formed when a wire or a touch sensor for configuring the flexible display panel 100 is formed, or it can be additionally formed on the surface of the flexible display panel 100. The magnetic pattern 110 is formed with a magnetic substance, and magnetism of the magnetic pattern 110 is recognized by the magnetic sensor 300. The magnetic pattern 110 is formed on the flexible display panel 100 in the first direction in which the flexible display panel 100 is provided in the housing 200.

The magnetic pattern 110 includes a plurality of sub-patterns (110a-110k) that have different magnetism degrees, i.e., different magnitudes of magnetic filed, and are separately disposed in the first direction, i.e., the sub-patterns (110a-110k) are spaced apart from each other along the first direction. The sub-patterns (110a-110k) have different lengths in the second direction.

In detail, as illustrated in FIG. 2, a length L1 of the sub-patterns (110a-110k) is gradually increased or decreased in the second direction, i.e., substantially crossing the first direction, with respect to distance in the first direction. For example, the length L1 decreases along the second direction in each sub-pattern, as a distance along the first direction increases. In other words, the length L1 of the sub-patterns (110a-110k) from a first sub-pattern 110a at a first end to a last sub-pattern 110k at a second end is gradually decreased in the second direction crossing the first direction as each additional sub-pattern is added in the first direction. Further, the length L1 of the sub-patterns (110a-110k) from the last sub-pattern 110k at the second end to the first sub-pattern 110a at the first end is gradually increased in the second direction crossing the first direction as each additional sub-pattern is added in the first direction.

Referring back to FIG. 1, the housing 200 supports a first end of the flexible display panel 100, and receives the flexible display panel 100 thereinside in the first direction so that the display area of the flexible display panel 100 may be variably exposed in the first direction, i.e., a size of the display area may be changed, e.g., varied, in accordance with a length of the flexible display panel 100 pulled out of the housing 200. That is, the housing 200 includes a rolled unit 210 on which the flexible display panel 100 is wound. The rolled unit 210 is provided inside the housing 200, and supports the first end of the flexible display panel 100. The rolled unit 210 winds the flexible display panel 100 so that the flexible display panel 100 may be provided in a first direction with respect to the housing 200. The rolled unit 210 is rotatable passively or actively, and when the rolled unit 210 is rotated, the flexible display panel 100 may be pulled out to unwind and extend in the first direction with respect to the housing 200.

Figure 3:
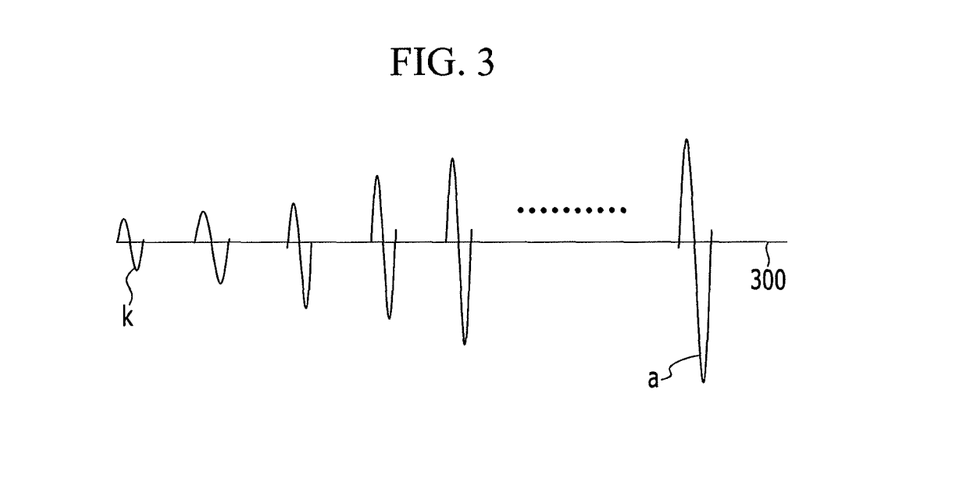
FIG. 3 shows a method for sensing a display device according to a first exemplary embodiment.

FIG. 3 shows a method for sensing a display device according to a first exemplary embodiment.

Referring to FIG. 2 and FIG. 3, the magnetic sensor 300 is provided in the housing 200 in correspondence to the magnetic pattern 110 formed on the flexible display panel 100. For example, the magnetic sensor 300 may be positioned to overlap the recognition pattern 110. The magnetic sensor 300 recognizes the magnetic pattern 110 to sense the display area of the flexible display panel 100 provided in the housing 200 and variably exposed to the outside in the first direction.

In detail, the magnetic sensor 300 can acquire a sensor output waveform in an analog voltage (Volt) type in a circuital manner when the magnetic pattern 110 passes by the magnetic sensor 300. That is, the magnetic sensor 300 recognizes, e.g., measures, intensity of the magnetism of the magnetic pattern 110 to sense, e.g., determined, the display area of the flexible display panel 100 provided in the housing 200 and exposed to the outside. That is, when the flexible display panel 100 is pulled out of the housing 200 in the first direction, the magnetism of the magnetic pattern 110 on the portion of the flexible display panel 100 that is pulled out of the housing 200 is detected by the magnetic sensor 300. That is, the magnetic sensor 300 detects the magnetic field of the exposed magnetic pattern 110 as a sensor output waveform. The sensor output waveform detected by the magnetic sensor 300 is changed into a digital value and is then recognized by the controller 400.

For example, the sub-pattern 110a at the first end from among the sub-patterns (110a-110k) is detected as a sensor output waveform (a) with a first size by the magnetic sensor 300, and the sub-pattern 110k at the second end from among the sub-patterns (110a-110k) is detected as a sensor output waveform (k) with a second size by the magnetic sensor 300. Therefore, the magnetic sensor 300 recognizes the sub-patterns (110a-110k) to detect the sensor output waveform (a) with the first size or the sensor output waveform (k) with the second size, and senses the display area of the flexible display panel 100 that is variably exposed according to the sensor output waveform (a) with the first size or the sensor output waveform (k) with the second size.

The magnetic sensor 300 has a length L2 along the second direction. The length L2 corresponds to, e.g., equals, a length L1 of the first sub-pattern 110a, i.e. the longest sub-pattern among the sub-patterns (110a-110k). The magnetic sensor 300 detects sensor output waveforms of different magnitudes depending on the lengths of the sub-patterns (110a-110k), so when the sub-patterns (110a-110k) are set to have different lengths, respectively, the number of sub-patterns to be configured can be set as desired by the user.

As described, when the flexible display panel 100 is provided in the housing 200 in the first direction, the magnetic sensor 300 senses the display area that is variably exposed in correspondence to the sub-patterns (110a-110k). A signal on the exposed display area of the flexible display panel 100 sensed by the magnetic sensor 300 is transmitted to the controller 400.

Figure 4:
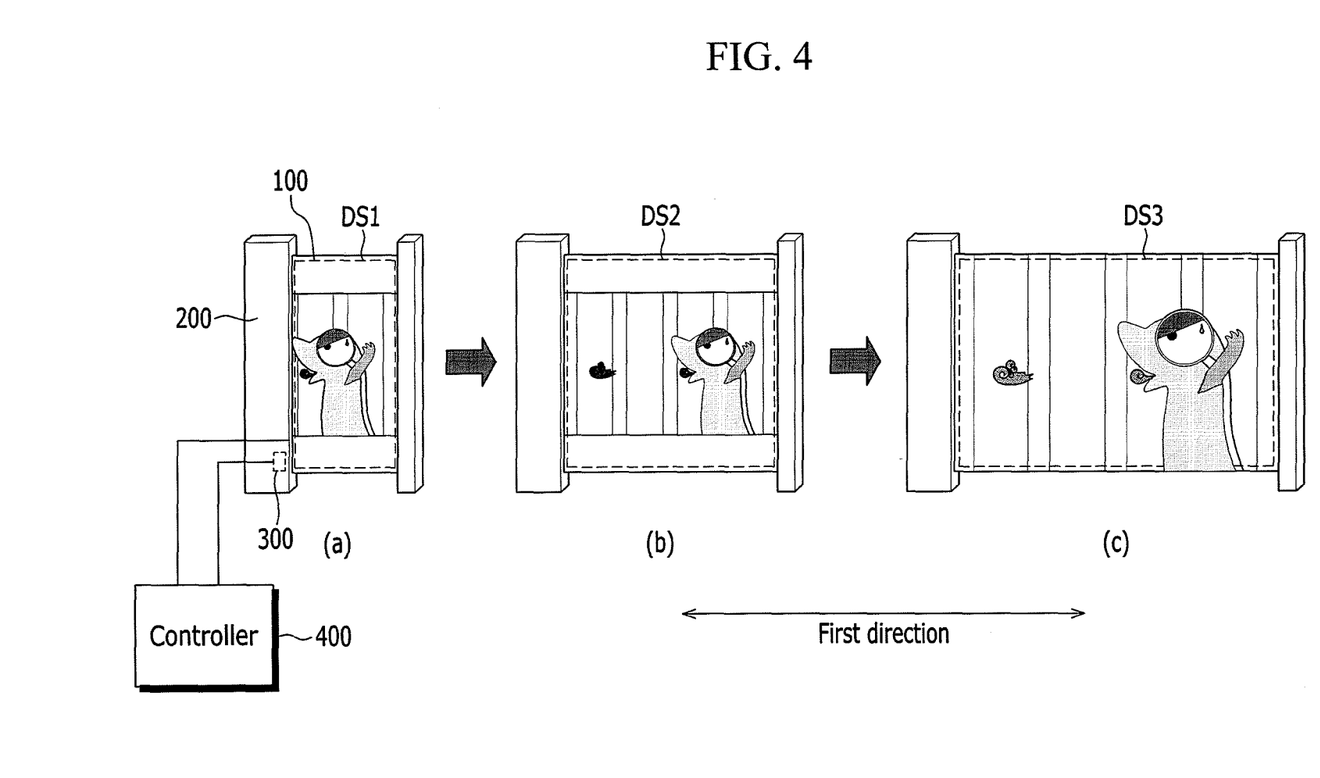
FIG. 4 shows an image displayed by a flexible display panel of a display device according to a first exemplary embodiment.

FIG. 4 shows an image displayed by a flexible display panel of a display device according to a first exemplary embodiment.

As shown in FIG. 4, the controller 400 is connected to the magnetic sensor 300 and the flexible display panel 100, and it displays the image corresponding to the exposed display area of the flexible display panel 100 sensed by the magnetic sensor 300 to the flexible display panel 100.

In detail, as shown in FIG. 4(a), when the flexible display panel 100 is pulled out of the housing 200 in the first direction for the first time and a first display area DS1 is exposed, the magnetic sensor 300 recognizes magnetism of the sub-pattern when the first display area DS1 is exposed from among the sub-patterns (110a-110k), it senses the first display area DS1 and transmits a signal of the first display area DS1 to the controller 400. The controller 400 receives the signal and displays an image of a first size corresponding to the first display area DS1 of the flexible display panel 100. In this instance, the controller 400 stores a value that corresponds to the exposed first display area DS1 of the flexible display panel 100 corresponding to the sub-pattern when the first display area DS1 is exposed, or it loads a stored value.

Further, as shown in FIG. 4(b), when the flexible display panel 100 is pulled out of the housing 200 in the first direction for a second time and a second display area DS2 that is greater than the first display area DS1 is exposed, the magnetic sensor 300 recognizes magnetism of the sub-pattern from among the sub-patterns (110a-110k) when the second display area DS2 is exposed, and it senses the second display area DS2 to transmit a signal of the second display area DS2 to the controller 400. The controller 400 receives the signal and displays an image of a second size corresponding to the second display area DS2 of the flexible display panel 100. In this instance, the controller 400 stores the value that corresponds to the exposed second display area DS2 of the flexible display panel 100 corresponding to the sub-pattern when the second display area DS2 is exposed or it loads the stored value.

Also, as shown in FIG. 4(c), when the flexible display panel 100 is pulled out of the housing 200 in the first direction for a third time and a third display area DS3 that is greater than the second display area DS2 is exposed, the magnetic sensor 300 recognizes magnetism of the sub-pattern when the third display area DS3 is exposed from among the sub-patterns (110a-110k), and it senses the third display area DS3 to transmit a signal of the third display area DS3 to the controller 400. The controller 400 receives the signal and displays an image of a third size that corresponds to the third display area DS3 of the flexible display panel 100. In this instance, the controller 400 stores the value that corresponds to the exposed third display area DS3 of the flexible display panel 100 corresponding to the sub-pattern when the third display area DS3 is exposed, or it loads the stored value.

Particularly, when the flexible display panel 100 is pulled out of the housing 200 in the first direction, the magnetic sensor 300 does not recognize an order of all of the sub-patterns (110a-110k) formed on the flexible display panel 100, but the magnetic sensor 300 senses the exposed display area of the flexible display panel 100 corresponding to the exposed sub-patterns (110a-110k). For example, if the sub-patterns (110a-110k) are spaced apart from each other along the first direction to overlap an entire length of the display area in the first direction, the magnetic sensor 300 may sense the sub-patterns on an exposed display area, e.g., the magnetic sensor 300 may detect the specific sub-pattern directly below in order to determine the sub-patterns on the exposed display area extending sequentially from the detected specific sub-pattern along the first direction, to determine a size of a desired image to be displayed. Therefore, when power is supplied to the display device under any condition, the display device recognizes the sub-pattern that corresponds to the currently exposed display area without monitoring the process for providing the flexible display panel 100 in the housing 200 and displays the image of a size that corresponds to the exposed display area.

As described, regarding the display device according to the first exemplary embodiment, the magnetic sensor 300 recognizes magnetism of the magnetic pattern 110 formed on the flexible display panel 100 to sense a size of the display area of the externally exposed flexible display panel 100. Therefore, the controller 400 provides an image size that corresponds, e.g., equals, the size of the exposed display area, e.g., a size of the portion of the flexible display panel 100 pulled out of the housing 200, as sensed and determined by the magnetic sensor 300. Accordingly, the image displayed by the display device is optimized in accordance with the variable size of the display area of the flexible display panel 100.

Particularly, the display device according to the first exemplary embodiment uses the magnetic sensor 300 in the housing 200 to recognize magnetism of the magnetic pattern 110 formed on the flexible display panel 100 and sense the display area of the externally exposed flexible display panel 100 provided in the housing 200 so when the exposed surface of the flexible display panel 100 is drawn from the housing 200 and is then bent nonlinearly, it can accurately sense the display area of the flexible display panel 100 that is output from the housing 200 and is exposed to the outside. That is, the display device according to the first exemplary embodiment does not sense the entire area of the flexible display panel 100 when it is discharged from the housing 200, i.e., the display device does not sense an area of the flexible display panel 100 still rolled inside the housing, but only a display area pulled out of the housing 200. The magnetic sensor 300 recognizes the magnetic pattern 110 on the exposed portion of the flexible display panel 100 in real-time and senses the display area of the flexible display panel 100 in accordance with the exposed magnetic patterns 110 on the exposed portion of the display device. Therefore, when the exposed surface of the flexible display panel 100 is nonlinearly bent, the display device can display an image of a size corresponding to the exposed surface of the display area by sensing the display area of the externally exposed flexible display panel 100.

Further, the display device according to the first exemplary embodiment does not count revolutions of the rolled unit 210 to indirectly sense the display area of the flexible display panel 100 and does not use a distance measuring means, such as infrared rays or ultrasonic waves, to sense the display area of the unfolded flexible display panel 100. Instead, the display device considers the flexible characteristic of the flexible display panel 100 and recognizes magnetism of the magnetic pattern 110 formed on the flexible display panel 100 in real-time to sense the exposed display area of the flexible display panel 100. As such, an image with an accurate size that corresponds to the variable display area of the flexible display panel 100 is variably displayed to the flexible display panel 100, which functions as a factor for improving the user's satisfaction with the display device.

Also, regarding the display device according to the first exemplary embodiment, when the flexible display panel 100 is pulled out of the housing 200 in the first direction, the magnetic sensor 300 does not recognize all of the sub-patterns (110a-110k) on the flexible display panel 100, but only the sub-patterns exposed in the exposed display areas of the flexible display panel 100. As such, the magnetic sensor 300 directly sense the exposed display area of the flexible display panel 100 corresponding to the sub-patterns (110a-110k). Therefore, when power is supplied to the display device under any conditions, the display device recognizes the sub-pattern corresponding to the currently exposed display area without monitoring the process for providing the flexible display panel 100 in the housing 200 and displays an image with a size corresponding to the exposed display area. That is, the magnetic sensor 300 independently identifies and recognizes the sub-patterns (110a-110j) with different magnetism and displays the image of the size corresponding to the exposed display area without an additional configuration when the power is suddenly turned off and on or when the flexible display panel 100 is unfolded and a part of it is folded.

Also, regarding the display device according to the first exemplary embodiment, the magnetic sensor 300 recognizes the magnetism of the magnetic pattern 110 to recognize the display area of the flexible display panel 100. Therefore, when an additional element is provided between the magnetic sensor 300 and the magnetic pattern 110, the magnetic sensor 300 recognizes the magnetism of the magnetic pattern 110 without a sensing error and recognizes the display area of the flexible display panel 100. That is, when an element is added between the magnetic sensor 300 and the magnetic pattern 110 for ease of design, the display area of the flexible display panel 100 is still easily sensed by the magnetic sensor 300. Further, when light is used for a recognition means between the flexible display panel and the sensor, the reliability of sensing the display area of the flexible display panel can be deteriorated because of external light, but the display device according to the first exemplary embodiment prevents deterioration of the sensing reliability since it uses magnetism as a recognition means between the magnetic pattern 110 of the flexible display panel 100 and the magnetic sensor 300.

A display device according to a second exemplary embodiment will now be described with reference to FIG. 5 and FIG. 6.

Parts that are different from the first exemplary embodiment will be described, and other parts that are not described follow the first exemplary embodiment. In the second exemplary embodiment, for better comprehension and ease of description, the same constituent elements will have the same reference numerals as the first exemplary embodiment.

Figure 5:
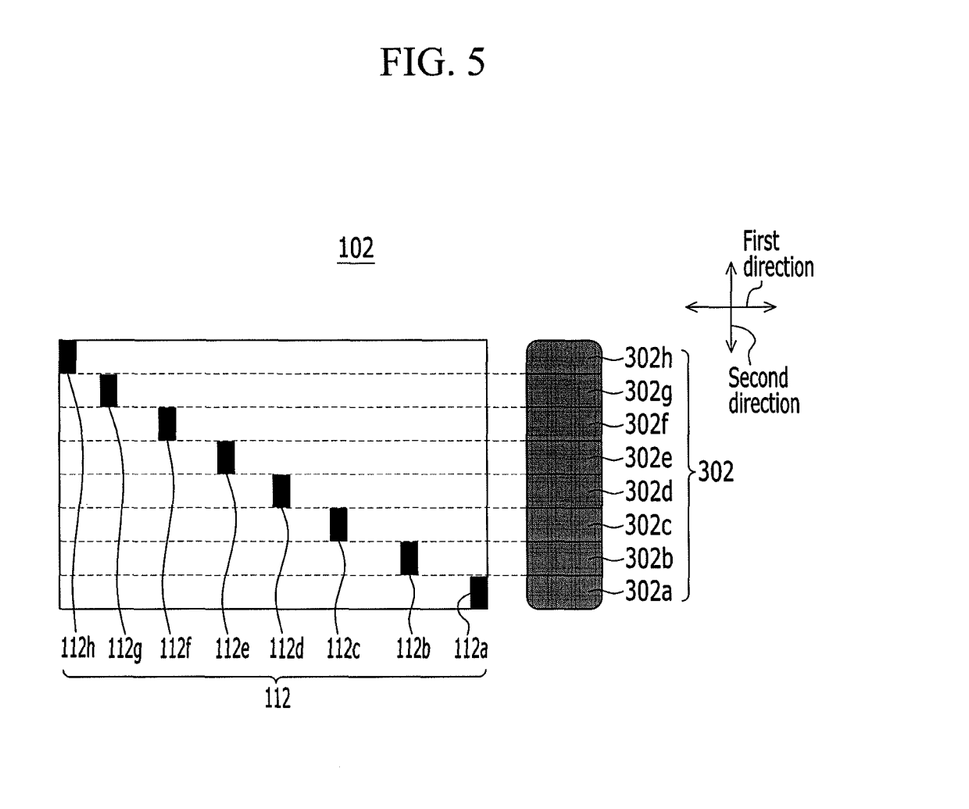
FIG. 5 shows a flexible display panel of a display device according to a second exemplary embodiment.

FIG. 5 shows a flexible display panel of a display device according to a second exemplary embodiment. For ease of description, FIG. 5 shows a rear surface of a flexible display panel 102 and a magnetic sensor 302.

As shown in FIG. 5, the flexible display panel 102 of a display device according to the second exemplary embodiment includes a magnetic pattern 112 provided in a first area on a rear surface on which an image is displayed or is not displayed. The magnetic pattern 112 can be provided on the front surface of the flexible display panel 102, the rear surface thereof, or between substrates, it can be formed when a wire or a touch sensor for configuring the flexible display panel 102 is formed, or it can be additionally formed on the surface of the flexible display panel 102. The magnetic pattern 112 is formed with a magnetic substance, and magnetism of the magnetic pattern 112 is recognized by the magnetic sensor 302. The magnetic pattern 112 is formed on the flexible display panel 102 in the first direction in which the flexible display panel 102 is provided in the housing 200. The magnetic pattern 112 includes a plurality of sub-patterns (112a-112h) that are formed at different positions, are separately disposed from each other in the first direction, and are separately disposed from each other in a second direction crossing the first direction. For example, as the sub-patterns (112a-112h) are spaced apart from each other along the first and second direction, the sub-patterns (112a-112h) may be arranged along a diagonal of the display area of the display device. The sub-patterns (112a-112h) can have equivalent, e.g., same, lengths.

Figure 6:
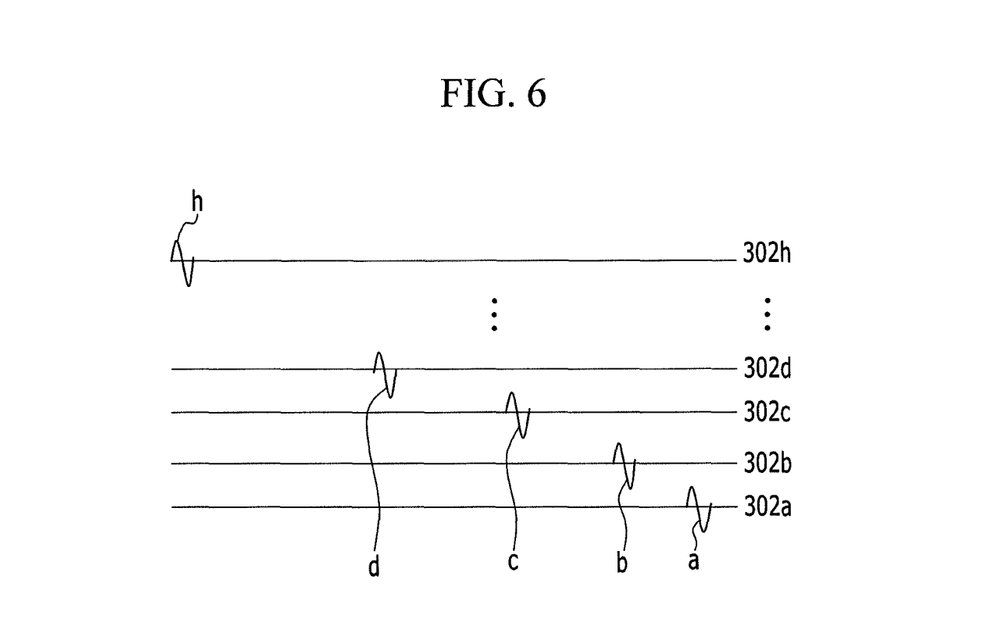
FIG. 6 shows a method for sensing a display device according to a second exemplary embodiment.

FIG. 6 shows a method for sensing a display device according to the second exemplary embodiment.

As shown in FIG. 5 and FIG. 6, the magnetic sensor 302 includes a plurality of sub-sensors (302a-302h) that correspond to the sub-patterns (112a-112h) formed on the flexible display panel 102 and are disposed in the second direction to neighbor each other. The sub-sensors (302a-302h) correspond to the sub-pattern (112a-112h) in the first direction, and the sub-sensors (302a-302h) recognize each magnetism of the sub-patterns (112a-112h) corresponding in the first direction.

The sub-sensor 302a from among the sub-sensors (302a-302h) can acquire a sensor output waveform in an analog voltage (Volt) form in a circuital manner when the sub-sensor 302a corresponding in the first direction from among the sub-patterns (112a-112h) passes through the sub-pattern 112a. That is, the magnetic sensor 302 recognizes the sub-patterns (112a-112h) corresponding to the sub-sensors (302a-302h) to sense the display area of the flexible display panel 102 provided in the housing 200 and exposed to the outside. In detail, when the flexible display panel 102 is provided in the housing 200 in the first direction, each magnetism of the sub-patterns (112a-112h) formed on the flexible display panel 102 is recognized by the sub-sensors (302a-302h), so the magnetic sensor 302 detects the recognized magnetism of the magnetic pattern 112 as a sensor output waveform. The sensor output waveform detected by the magnetic sensor 302 is changed into a digital value and is then recognized by the controller 400.

For example, the sub-pattern 112a at the first end from among the sub-patterns (112a-112h) is detected as a first sensor output waveform (a) by the sub-sensor 302a at the first end from among the sub-sensors (302a-302h), and the sub-pattern 112h at the second end from among the sub-patterns (112a-112h) is detected as a second sensor output waveform (h) by the sub-sensor 302h at the second end from among the sub-sensors (302a-302h). Therefore, the magnetic sensor 302 recognizes the sub-patterns (112a-112h) to detect waveforms from the first sensor output waveform (a) to the second sensor output waveform (h), and senses the display area of the flexible display panel 102 variably exposed according to the waveforms from the first sensor output waveform (a) to the second sensor output waveform (h).

The magnetic sensor 302 detects the sub-patterns (112a-112h) as sensor output waveforms depending on their positions. Therefore, when the number of sub-patterns (112a-112h) corresponds to the number of sub-sensors (302a-302h), the number of the sub-patterns and the sub-sensors can be set as desired by the user.

As described, when the flexible display panel 102 is provided in the housing 200 in the first direction, the magnetic sensor 302 senses the display area that is variably exposed in correspondence to the sub-patterns (112a-112h). A signal on the exposed display area of the flexible display panel 102 sensed by the magnetic sensor 302 is transmitted to the controller 400.

Accordingly, regarding the display device according to the second exemplary embodiment, the magnetic sensor 302 recognizes magnetism of the magnetic pattern 112 formed on the flexible display panel 102 to sense the display area of the flexible display panel 102 provided in the housing 200 and exposed to the outside, and displays the image corresponding to the display area to the flexible display panel 102. That is, the display device for displaying the image that is optimized for the flexible characteristic of the flexible display panel 102 is provided.

Particularly, the display device according to the second exemplary embodiment uses the sub-sensors (302a-302h) to recognize the sub-sensor the magnetism of which is recognized from among the sub-sensors (302a-302h) and sense the display area of the flexible display panel 102, so it uses the sub-sensors (302a-302h) to individually recognize the sub-patterns (112a-112h), sense the accurate display area of the flexible display panel 102, and display the accurate-size image corresponding to the exposed display area.

A display device according to a third exemplary embodiment will now be described with reference to FIG. 7 and FIG. 8. Parts that are different from the first exemplary embodiment will be described, and other parts that are not described follow the first exemplary embodiment.

Figure 7:
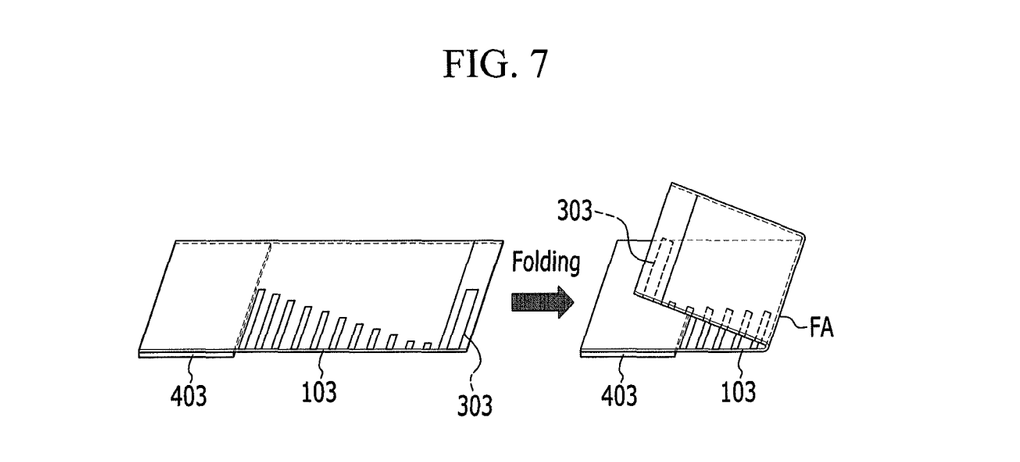
FIG. 7 shows a display device according to a third exemplary embodiment.

FIG. 7 shows a display device according to the third exemplary embodiment. FIG. 8 shows a rear surface of a display device according to the third exemplary embodiment.

Figure 8:
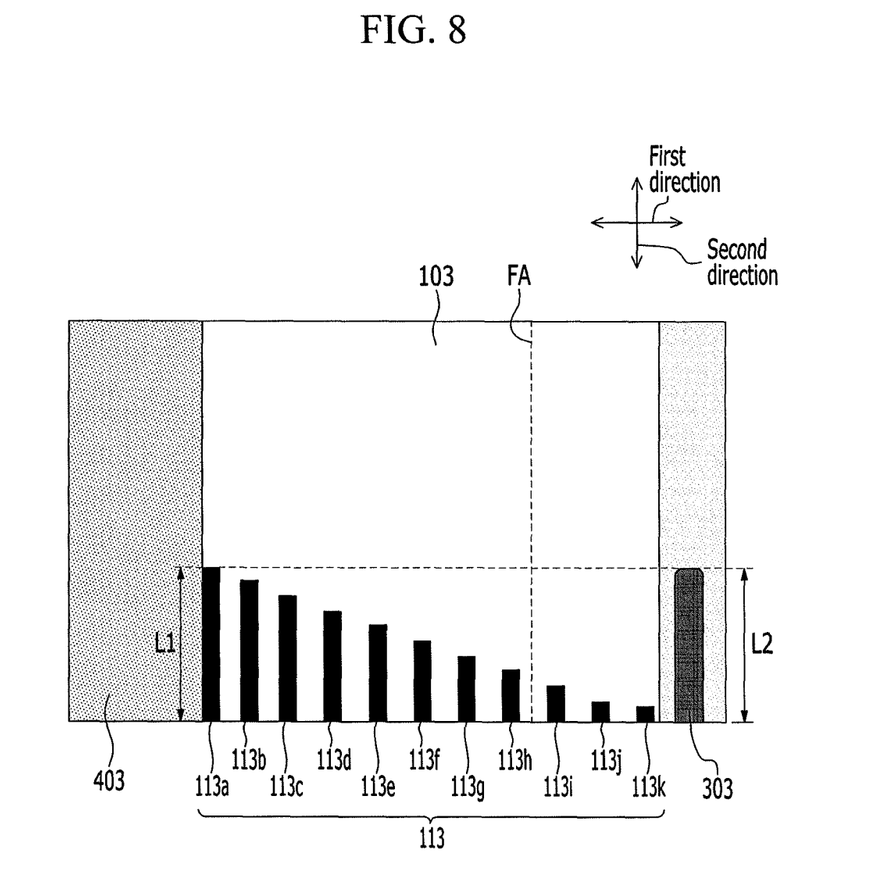
FIG. 8 shows a rear surface of a display device according to a third exemplary embodiment.

As shown in FIG. 7 and FIG. 8, the display device according to the third exemplary embodiment includes a flexible display panel 103, a magnetic sensor 303, and a controller 403.

A first area (FA) of the flexible display panel 103 is folded. When the first area (FA) of the flexible display panel 103 is folded, the display area of the flexible display panel 103 for displaying the image is variably exposed to the outside in the first direction. A first end of the flexible display panel 103 contacts a plate surface of the flexible display panel 103 when the first area (FA) of the flexible display panel 103 is folded and provided in the first direction. The flexible display panel 103 includes a magnetic pattern 113 formed on the plate surface that is a rear surface for displaying the image or displaying no image.

The magnetic pattern 113 can be provided on the front surface of the flexible display panel 103, the rear surface thereof, or between two neighboring substrates, it can be formed when a wire or a touch sensor for configuring the flexible display panel 103 is formed, or it can be additionally formed on the surface of the flexible display panel 103. The magnetic pattern 113 is formed with a magnetic substance, and magnetism of the magnetic pattern 113 is recognized by the magnetic sensor 303. The magnetic pattern 113 is formed on the flexible display panel 103 in the first direction in which a first area (FA) of the flexible display panel 103 is folded and the display area is variably exposed. The magnetic patterns 113 includes a plurality of sub-patterns (113a-113k) having different magnetism and separately disposed from each other in the first direction. The sub-patterns (113a-113k) have different lengths in the first direction. In detail, the length L1 of the sub-patterns (113a-113k) is gradually increased or decreased in a second direction crossing the first direction when they go in the first direction, and the length L1 of the sub-patterns (113a-113k) from the sub-pattern 113a at a first end to the sub-pattern 113k at a second end from among the sub-patterns (113a-113k) is gradually decreased in the second direction crossing the first direction as they go in the first direction. Further, the length L1 of the sub-patterns (113a-113k) from the sub-pattern 113k at the second end to the sub-pattern 113a at the first end from among the sub-patterns (113a-113k) is gradually increased in the second direction crossing the first direction as they go in the first direction.

The magnetic sensor 303 is provided on an end of the flexible display panel 103 contacting the plate surface of the flexible display panel 103 on which the magnetic pattern 113 is formed when the first area (FA) of the flexible display panel 103 is folded. When the end of the flexible display panel 103 contacts the plate surface of the flexible display panel 103, the magnetic sensor 303 recognizes the magnetic pattern 113 formed on the plate surface of the flexible display panel 103, and the magnetic sensor 303 senses the display area of the flexible display panel 103 variably exposed in the first direction. The magnetic sensor 303 has the length L2 that corresponds to the sub-pattern 113a that is the longest in the second direction from among the sub-patterns (113a-113k). The method for sensing the display area of the flexible display panel 103 using the magnetic sensor 303 has already been described in the first exemplary embodiment.

The controller 403 is provided at the second end of the flexible display panel 103.

Regarding the display device according to the third exemplary embodiment, the magnetic sensor 303 recognizes magnetism of the magnetic pattern 113 formed on the flexible display panel 103 to sense the display area of the flexible display panel 103 variably exposed to the outside when the first area (FA) is folded, and displays the image that corresponds to the display area to the flexible display panel 103. That is, the display device for displaying the image optimized for the flexible characteristic of the flexible display panel 103 is provided.

Particularly, the display device according to the third exemplary embodiment uses the magnetic sensor 303 provided on the first end of the flexible display panel 103 to recognize the magnetism of the magnetic pattern 113 formed on the flexible display panel 103 and sense the display area of the flexible display panel 103 variably exposed to the outside when the first area (FA) is folded, so when the exposed plate surface of the flexible display panel 103 is nonlinearly bent, the display area of the flexible display panel 103 exposed to the outside can be accurately sensed. That is, regarding the display device according to the third exemplary embodiment, when the first area (FA) of the flexible display panel 103 is folded, the magnetic sensor 303 recognizes the magnetic pattern 113 of the flexible display panel 103 in real-time to sense the display area of the flexible display panel 103 exposed to the outside so when the exposed plate surface of the flexible display panel 103 is non-linearly bent, it can use the magnetic pattern 113 to sense the accurate display area of the flexible display panel 103 exposed to the outside and thereby display the image of a size corresponding to the display area.

Further, the display device according to the third exemplary embodiment does not sense the display area of the flexible display panel 103 provided in the housing, and the flexible display panel 103 is folded to sense the display area variably changed when the flexible display panel 103 is folded, and the image optimized for the flexible display panel 103 is displayed to the flexible display panel 103, which functions as a factor for improving the user's satisfaction on the display device.

Further, regarding the display device according to third exemplary embodiment, after the flexible display panel 103 is folded, the magnetic sensor 303 recognizes one of the sub-patterns (113a-113k) formed on the flexible display panel 103 to sense the display area of the flexible display panel 103 and recognize the exposed display area of the flexible display panel 103 corresponding to the one sub-pattern so when power is supplied to the display device under any condition, the display device recognizes the one sub-pattern corresponding to the currently exposed display area and displays the image of a size corresponding to the exposed display area without monitoring the process for folding the flexible display panel 103. That is, the magnetic sensor 303 identifies and recognizes the sub-patterns (113a-113k) with different magnetism, and when the power is abruptly turned off and is then turned on or when the flexible display panel 103 is bent or other events occur, the display device according to the third exemplary embodiment displays the image of a size corresponding to the display area.

Also, regarding the display device according to the third exemplary embodiment, the magnetic sensor 303 recognizes magnetism of the magnetic pattern 113 to recognize the display area of the flexible display panel 103, and when an additional element is provided between the magnetic sensor 303 and the magnetic pattern 113, the magnetic sensor 303 recognizes the magnetism of the magnetic pattern 113 without a sensing error to recognize the display area of the flexible display panel 103. That is, when an additional element if provided between the magnetic sensor 303 and the magnetic pattern 113 for ease of design, the magnetic sensor 303 easily senses the display area of the flexible display panel 103. Particularly, when light is used for a recognition means between the flexible display panel and the sensor, reliability for sensing the display area of the flexible display panel may be deteriorated by external light, and the display device according to the third exemplary embodiment uses the magnetism for a recognition means between the magnetic pattern 113 of the flexible display panel 103 and the magnetic sensor 303, thereby preventing deterioration of the sensing reliability.

A display device according to a fourth exemplary embodiment will now be described with reference to FIG. 9. Parts that are different from the third exemplary embodiment will be described, and other parts that are not described follow the third exemplary embodiment.

Figure 9:
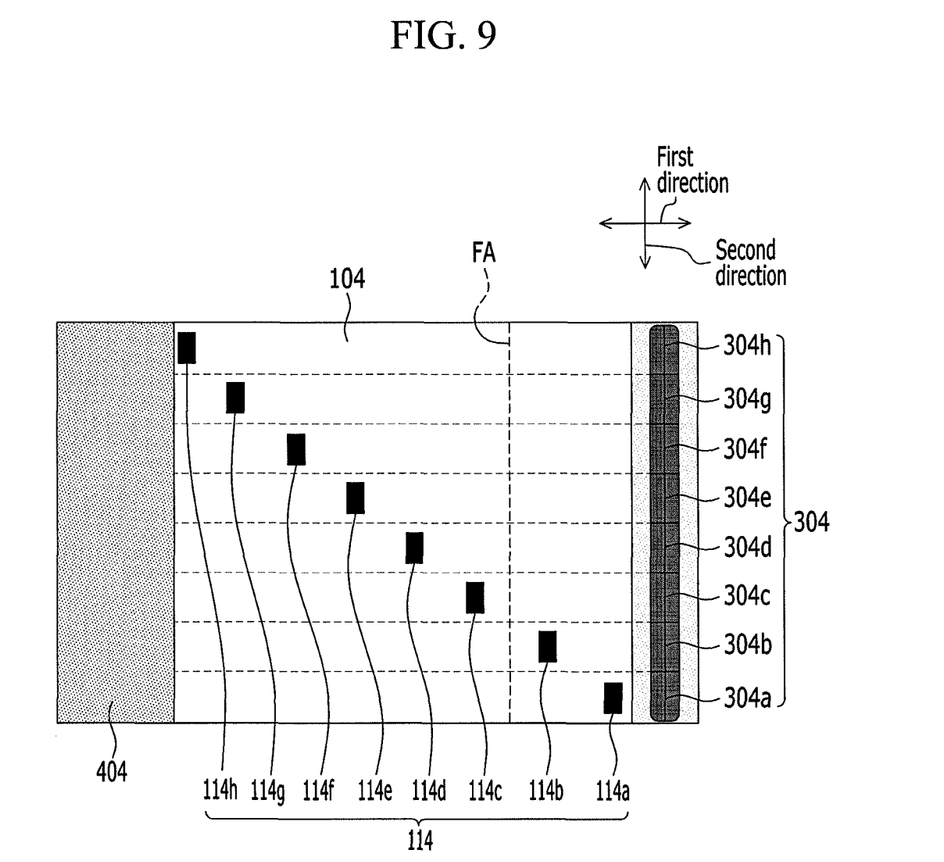
FIG. 9 shows a rear surface of a display device according to a fourth exemplary embodiment.

FIG. 9 shows a rear surface of a display device according to a fourth exemplary embodiment. As shown in FIG. 9, the flexible display panel 104 of the display device according to the fourth exemplary embodiment includes a magnetic pattern 114 provided in an area of a rear surface for displaying an image or no image.

The magnetic pattern 114 is formed on the flexible display panel 104 in the first direction in which a first area (FA) of the flexible display panel 104 is folded and the display area is variably exposed. The magnetic pattern 114 includes a plurality of sub-patterns (114a-114h) that are formed at different positions, are separately disposed in the first direction, and are separately disposed in a second direction crossing the first direction. The plurality of sub-patterns (114a-114h) may have the same length.

A magnetic sensor 304 includes a plurality of sub-sensors (304a-304h) that are disposed to neighbor each other in the second direction corresponding to the sub-patterns (114a-114h) formed on the flexible display panel 104. The sub-sensors (304a-304h) correspond to the sub-patterns (114a-114h) in the first direction, and recognize each magnetism of the sub-patterns (114a-114h) corresponding in the first direction.

One sub-sensor 304a of the sub-sensors (304a-304h) can acquire a sensor output waveform in an analog voltage (Volt) form in a circuital manner when one sub-pattern 114a corresponding in the first direction from among the sub-patterns (114a-114h) passes over the sub-sensor 304a. That is, when the first area (FA) of the flexible display panel 104 is folded and the end of the flexible display panel 104 contacts the plate surface of the flexible display panel 104, the sub-sensors (304a-304h) recognize the sub-patterns (114a-114h), and the magnetic sensor 304 accordingly sense the display area of the flexible display panel 104 variably exposed in the first direction. The method for sensing the display area of the flexible display panel 104 by the magnetic sensor 304 including the sub-sensors (304a-304h) has been described in the second exemplary embodiment.

As described, regarding the display device according to the fourth exemplary embodiment, the magnetic sensor 304 recognizes the magnetism of the magnetic pattern 114 formed on the flexible display panel 104 to sense the display area of the flexible display panel 104 variably exposed to the outside when the first area (FA) is folded, and the image corresponding to the display area is displayed to the flexible display panel 104, thereby providing the display device for displaying the image optimized for the flexible characteristic of the flexible display panel 104.

Particularly, the display device according to the fourth exemplary embodiment uses the sub-sensors (304a-304h) to recognize the sub-sensor from which magnetism is recognized from among the sub-sensors (304a-304h) and sense the display area of the flexible display panel 104, and it accordingly uses the sub-sensors (304a-304h) to independently recognize the sub-patterns (114a-114h) to sense the accurate display area of the flexible display panel 104 and display the image of the accurate size corresponding to the exposed display area.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
 a flexible display panel with a magnetic pattern including a magnetic substance, the magnetic pattern having a plurality of sub-patterns with different magnetism degrees;
 a magnetic sensor to recognize magnetism of the magnetic pattern and to sense a display area of the flexible display panel in accordance with the magnetic pattern, the display area being variable in a first direction; and
 a controller connected to the magnetic sensor and to the flexible display panel, the controller displaying on the flexible display panel an image corresponding to the display area of the flexible display panel sensed by the magnetic sensor.

2. The display device of claim 1, further comprising a housing accommodating the flexible display panel, the flexible display extending out of the housing in the first direction, and the display area of the flexible display panel being variably exposed in the first direction.

3. The display device of claim 2, wherein the housing includes a rolled unit, the flexible display panel being wound on the rolled unit.

4. The display device of claim 2, wherein the magnetic sensor is in the housing and corresponding to the magnetic pattern.

5. The display device of claim 1, wherein a first end of the flexible display panel contacts a plate surface of the flexible display panel provided in the first direction when a first area of the flexible display panel is bent so that the display area of the flexible display panel may be variably exposed in the first direction.

6. The display device of claim 5, wherein the magnetic sensor is at the first end of the flexible display panel.

7. The display device of claim 1, wherein the magnetic pattern is on the flexible display panel and extends in the first direction.

8. The display device of claim 7, wherein the plurality of sub-patterns are spaced apart from each other in the first direction.

9. A display device, comprising:
a flexible display panel with a magnetic pattern, the magnetic pattern including a plurality of sub-patterns with a magnetic substance;
a magnetic sensor to recognize magnetism of the magnetic pattern and to sense a display area of the flexible display panel in accordance with the magnetic pattern, the display area being variable in a first direction; and
a controller connected to the magnetic sensor and to the flexible display panel, the controller displaying on the flexible display panel an image corresponding to the display area of the flexible display panel sensed by the magnetic sensor,
wherein lengths of the sub-patterns in a second direction gradually increase with respect to a distance along the first direction, first and second directions crossing each other.

10. The display device of claim 9, wherein the magnetic sensor has a length in the second direction that corresponds a sub-pattern that is the longest among the sub-patterns.

11. A display device, comprising:
a flexible display panel with a magnetic pattern, the magnetic pattern including a plurality of sub-patterns with a magnetic substance;
a magnetic sensor to recognize magnetism of the magnetic pattern and to sense a display area of the flexible display panel in accordance with the magnetic pattern, the display area being variable in a first direction; and
a controller connected to the magnetic sensor and to the flexible display panel, the controller displaying on the flexible display panel an image corresponding to the display area of the flexible display panel sensed by the magnetic sensor,
wherein the plurality of sub-patterns are spaced apart from each other in the first direction;
wherein the sub-patterns are spaced apart from each other in a second direction crossing the first direction.

12. The display device of claim 11, wherein the magnetic sensor includes a plurality of sub-sensors neighboring each other in the second direction, the sub-sensors corresponding to the sub-patterns in the first direction.

13. The display device of claim 8, wherein the plurality of sub-patterns of the magnetic pattern have increasing magnetism degrees along the first direction.

14. The display device of claim 1, wherein each sub-pattern of the magnetic pattern has a unique magnetism degree relative to other sub patterns of the magnetic pattern.

15. The display device of claim 14, wherein each sub-pattern of the magnetic pattern has a unique position corresponding to its magnetism degree.

* * * * *